United States Patent [19]

Blomquist et al.

[11] Patent Number: 4,540,460
[45] Date of Patent: Sep. 10, 1985

[54] SLEW CONTROL MOUNTING DEVICE FOR LABEL MAGAZINE

[75] Inventors: Leonard A. Blomquist, Joliet; John Avery, Matteson, both of Ill.

[73] Assignee: Continental Packaging Company, Inc., Stamford, Conn.

[21] Appl. No.: 572,337

[22] Filed: Jan. 20, 1984

[51] Int. Cl.³ ............ B65C 9/08; A23G 1/20; B20B 3/10; B29C 27/14
[52] U.S. Cl. ............ 156/571; 156/570; 156/573; 156/564; 425/126 R; 425/127; 425/117; 264/509
[58] Field of Search ............ 156/364, 564–567, 156/570, 573, DIG. 27–DIG. 31, 571–572; 248/177, 180, 251, 185, 188.2, 299, 346, 652; 269/74–75, 902; 271/145, 162; 264/509; 425/126 R, 127, 117

[56] References Cited

U.S. PATENT DOCUMENTS

| 2,764,408 | 9/1956 | Weiler | 271/162 |
| 2,901,208 | 8/1959 | Jones | 248/346 |
| 3,054,589 | 9/1962 | Godsey | 248/185 |
| 3,215,582 | 11/1965 | Carter | 156/564 |
| 4,040,587 | 8/1977 | Gottschalk et al. | 248/185 |
| 4,355,967 | 10/1982 | Hellmer | 264/509 |

FOREIGN PATENT DOCUMENTS 1064504  5/1954  France.

Primary Examiner—Edward Kimlin
Assistant Examiner—Merrell C. Cashion
Attorney, Agent, or Firm—Charles E. Brown

[57] ABSTRACT

This relates to the mounting of a label magazine in a manner wherein labels carried by such label magazine may be rotated or slewed about a line extending axially of the label magazine through the center of a label. The slew control device is used to effect such rotation and thus orientation of a label so as properly to position the label for transfer. In the preferred usage of the slew control device, each label is transferred into a blow mold half and proper orientation of a label with respect to a blow mold half cavity is obtained utilizing the slew control device. This abstract forms no part of the specification of this application and is not to be construed as limiting the claims of the application.

11 Claims, 7 Drawing Figures

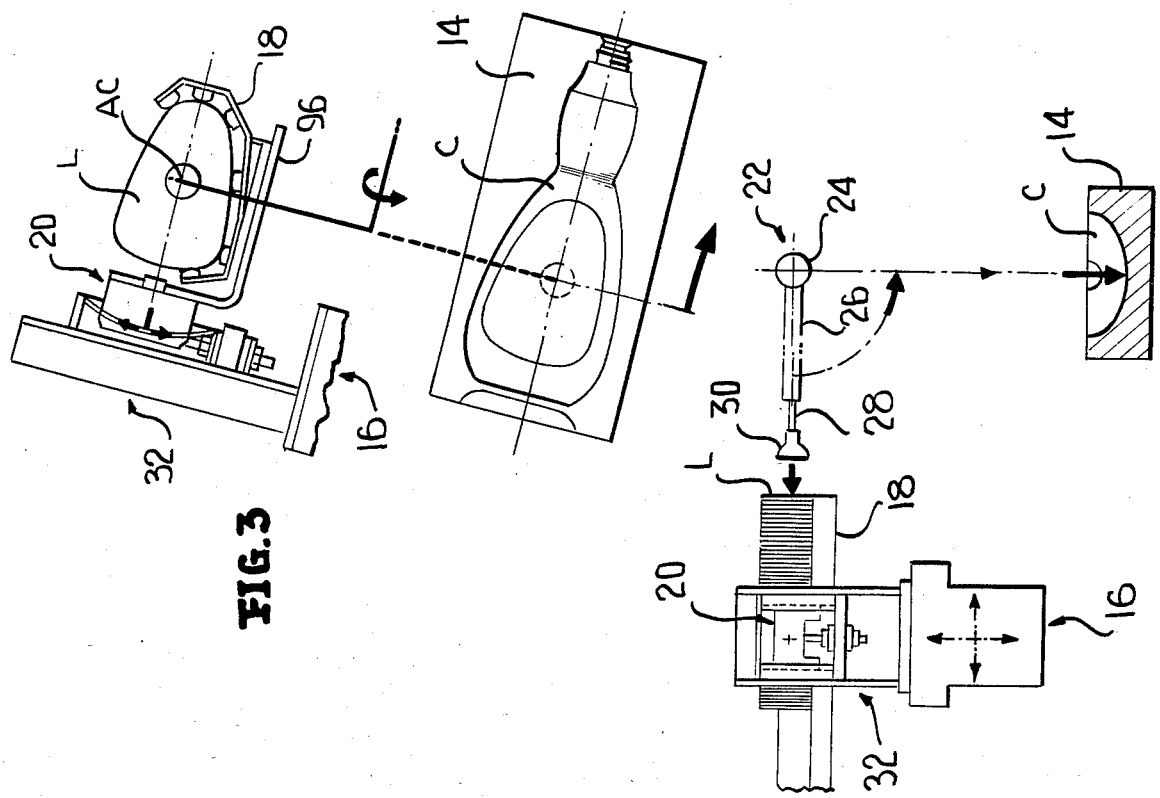
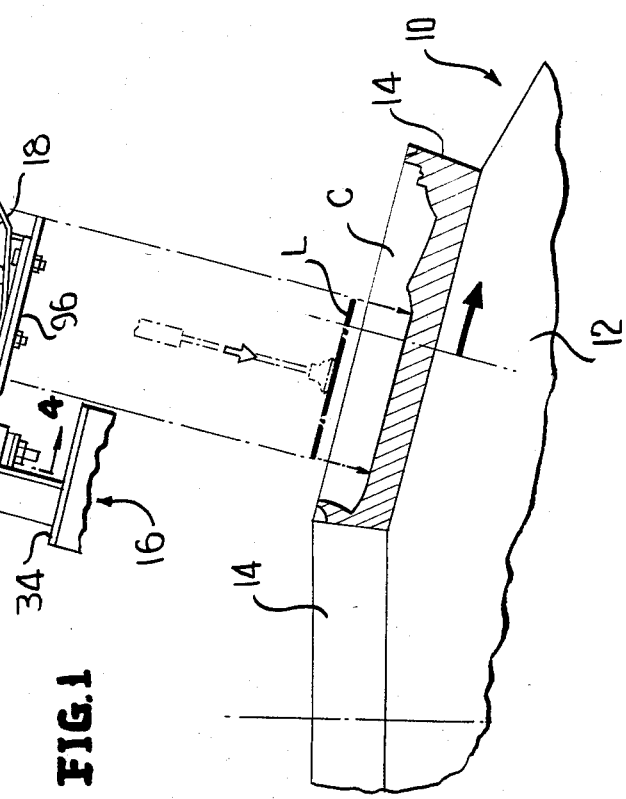

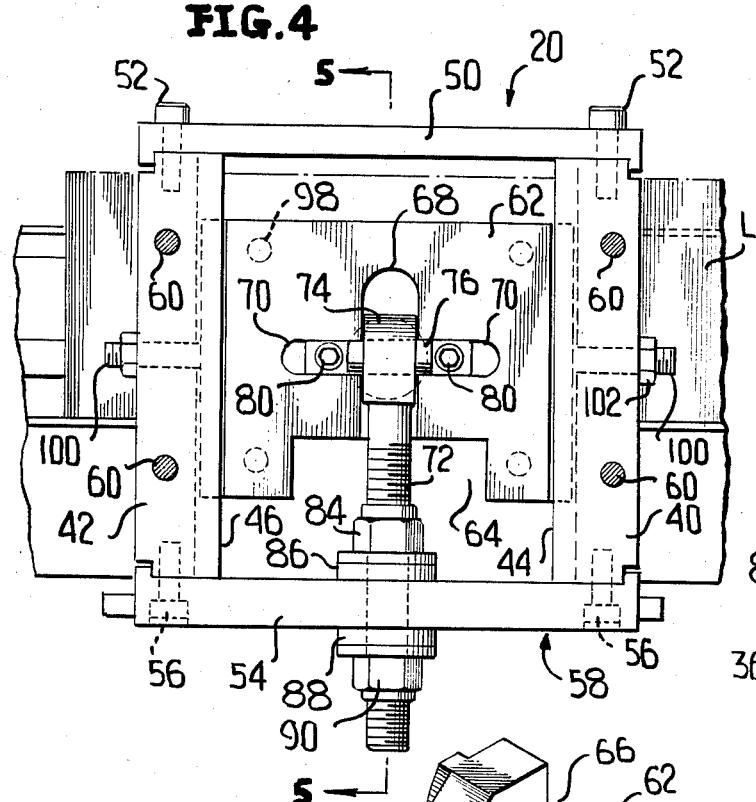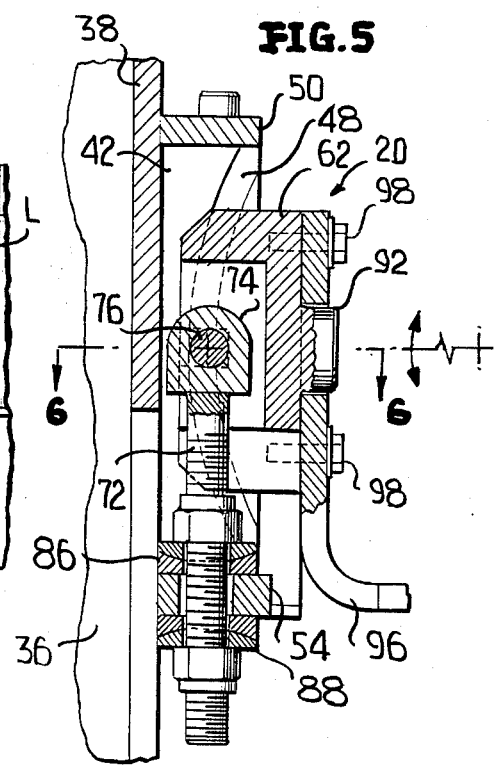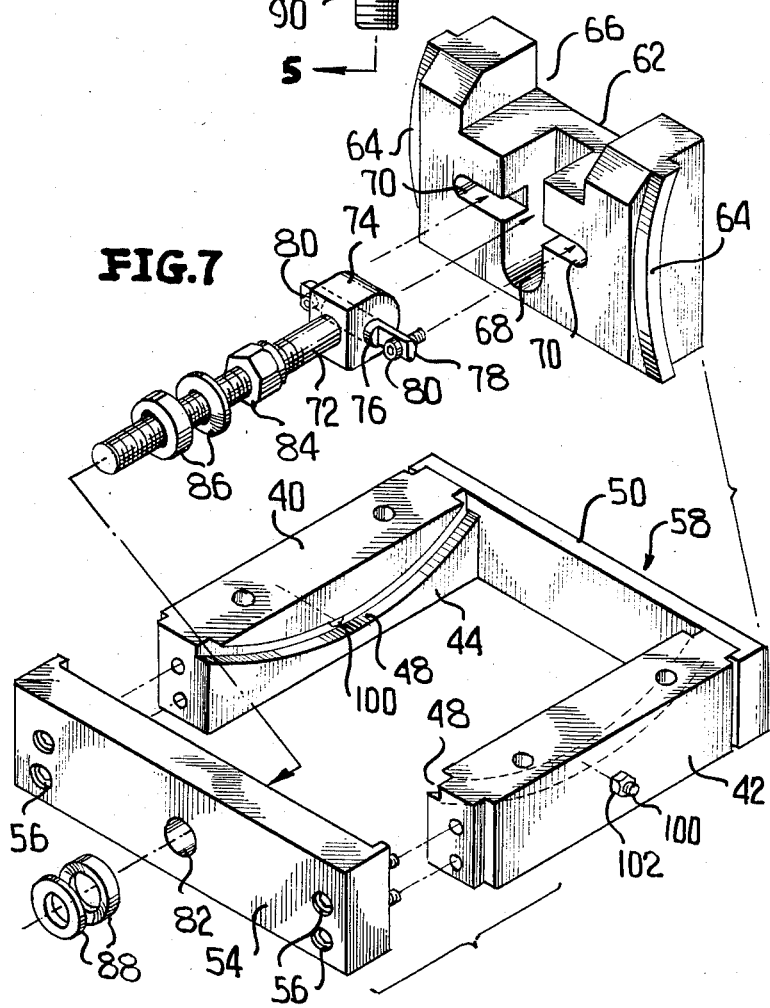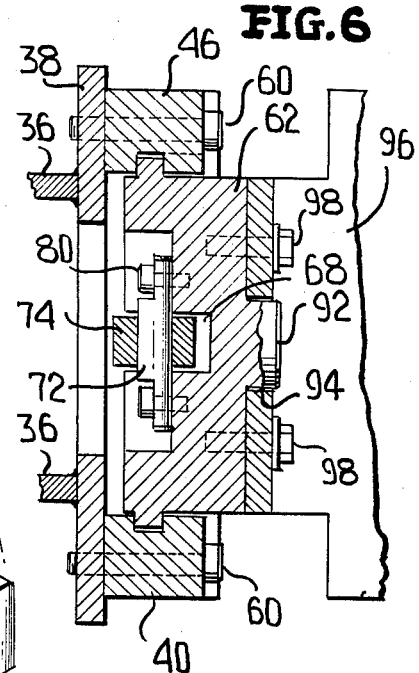

SLEW CONTROL MOUNTING DEVICE FOR LABEL MAGAZINE

This invention relates in general to new and useful improvements in supports for label magazines, and more particularly to a slew control for labels which are particularly carried by magazines for transfer to a blow mold half cavity.

It is customary to place labels in one or both halves of a blow mold while the mold is in its open state and prior to the positioning of a preform or parison therein, whereby, when a bottle or like article is blow molded, the label becomes a substantially unitary part of the blow molded article. This requires specific positioning and orientation of a foremost label within an associated magazine so that when the label is transferred from the magazine to the blow mold half cavity, the label will not only be properly positioned along the length of the cavity and also transversely of the cavity, but will also have the proper orientation or slew relative to the mold cavity. This invention particularly relates to a slew control device.

In accordance with this invention, there is provided a slew control device which is mounted for movement along a line of curvature having a center passing through the center of a stack of labels carried by a magazine, whereby labels may be tilted in their respective plane about their center so as to control slew or orientation of the label relative to a blow mold cavity into which a label is to be placed.

With the above and other objects in view that will hereinafter appear, the nature of the invention will be more clearly understood by reference to the following detailed description, the appended claims, and the several views illustrated in the accompanying drawings.

IN THE DRAWINGS

FIG. 1 is a schematic elevational view showing the slew control device as used in positioning a label magazine relative to parts of a rotary blow mold, whereby a label is placed into the cavity of each inner blow mold half.

FIG. 2 is a schematic elevational view taken generally at right angles to the mold and label magazine of FIG. 1, and shows schematically how a label is transferred from the magazine into a blow mold half cavity.

FIG. 3 is a schematic fragmentary elevational view similar to FIG. 1, but with the blow mold half into which a label is to be placed being rotated 90° and rotationally out-of-phase to show the relationship of a label carried by the magazine and a label being placed in the blow mold half cavity.

FIG. 4 is an elevational view taken generally along the line 4—4 of FIG. 1, and shows the slew control device from the back side thereof.

FIG. 5 is a vertical sectional view taken generally along the line 5—5 of FIG. 4, and shows specifically the construction of the slew control device.

FIG. 6 is a horizontal sectional view taken through the slew control device generally along the line 6—6 of FIG. 5, and shows further the details thereof.

FIG. 7 is an exploded perspective view showing the specifics of the various elements of the slew control device.

Referring now to the drawings in detail, reference is first made to FIG. 1 wherein there is diagrammatically shown a minor portion only of a rotary blow molding machine of the ferris wheel type, the blow molding machine being generally identified by the numeral 10. The machine 10 includes a wheel-like member 12 which is mounted for rotation about a fixed horizontal axis (not shown). The wheel-like member 12 has fixedly mounted thereon a plurality of circumferentially adjacent blow mold inner halves 14. For each blow mold inner half 14 there is an outer half (not shown) which moves radially so as to be spaced radially from the associated inner half 14 for the purpose of discharging a newly blown article. While the blow mold halves are separated, in accordance with a feature of this invention a label L is placed in the cavity C of each inner blow mold half 14. As the wheel-like member 12 rotates, an endless tube parison is extruded between the open halves and thereafter the halves are closed to clamp a section of such parison within each mold.

This particular invention relates to controlling the slew or rotational position of a label relative to the axis of the blow mold half cavity.

There is fixedly mounted relative to the blow molding machine 10 a support 16 which is diagrammatically illustrated as being adjustable relative to the machine 10 in various directions as indicated by the several arrows. Normally a label magazine or trough 18 is directly carried by the support 16. However, in accordance with this invention, in lieu of the label magazine 18 being fixedly mounted relative to the support 16, there is provided a slew control device 20 which is the subject of this invention.

The slew control device 20 controls the slew or rotational position of a label of a stack of labels relative to a line extending through the centers of the labels in the stack.

With respect to FIG. 2, it will be seen that there is provided a transfer device 22 which is only schematically illustrated for transferring a foremost label L from the stack of labels carried by the magazine 18 into the cavity C of a blow mold inner half 14. The illustrated transfer device 22 in its simplest aspect includes a rotary heat 24 which carries an extensible fluid motor 26 having an extensible piston rod 28 which carries a suction head 30.

In operation, the transfer device 22 picks up a label L, rotates it on the order of 90° to a position parallel to the path of the inner mold half 14 with the label L being positioned so as to just clear the mold half 14, as is shown in phantom lines in FIG. 1. As the mold inner half 14 advances in a clockwise direction as shown by the arrow of FIG. 1, the transfer device 22 is actuated at a time accurately to position the label L along the length of the cavity C in a preselected position.

It will be readily apparent that the position of the label magazine 18 may be adjusted using the adjustable support 16 so that the label L being transferred will be accurately positioned longitudinally and transversely of the cavity C. However, it is also necessary that the label L be correctly oriented relative to the mold cavity C in its longitudinal axis. This is what is generally described as slew control.

In accordance with this invention, the support 16 carries a mounting bracket arrangement generally identified by the numeral 32. The mounting bracket arrangement 32 includes a mounting plate 34 which is secured to the adjustable support 16. Extending from the mounting plate 34 is a support 36 which carries a further mounting plate 38 which is disposed substantially normal to the mounting plate 34. The mounting plate 38 has fixedly mounted thereon the slew control device 20.

Referring now to FIGS. 4-7, it will be seen that the slew control device 20 includes a pair of side rails 40, 42. The side rails 40, 42 have opposed faces 44, 46 in which there are formed trackways or grooves 48 having a preselected radius of curvature, as will be described hereinafter.

The side rails 40, 42 are joined together at one end by an end rail 50 which is secured in place by means of fasteners 52, as is best shown in FIG. 4. The opposite ends of the side rails 40, 42 are joined together by a second end rail 54 which is secured in place by means of fasteners 56. It is to be understood that the side rails 40, 42 and the end rails 50, 54 form a rigid base which is generally identified by the numeral 58. The base 58 is fixedly secured to the mounting plate 38 by fasteners 60 (FIGS. 4 and 6).

The slew control device 20 also includes a mounting plate 62 which, as is clearly shown in FIG. 7, has extending along opposite sides thereof in projecting relation curved rails 64 which are received in the grooves 48 for guided sliding relation. It is to be understood that the curvature of the rails 64 corresponds to the curvature of the grooves 48.

One end of the mounting plate 62 is provided with a notch 66. Further, the bottom of the mounting plate 62 is provided with a notch 68. There is further a notch 70 which extends transversely of the notch 68.

The slew control device 20 includes an adjusting rod 72 which carries at one end thereof a pivot head 74 which is mounted for rotation or pivoting on a pivot shaft 76. The pivot shaft 76 has flattened end portions 78 which seat in the notches 70 while the head 74 is received in the notch 68. The flattened end portions 78 are secured by fasteners 80 to the mounting plate 62.

The end rail 54 has a large diameter bore, or possibly a slot 82 therethrough. The adjusting rod 72 freely passes through the bore 82.

On that portion of the adjusting rod 72 lying within the base 58 is an inner adjusting nut 84 which has associated therewith a two-piece spherical washer assembly 86 that bears against the inner face of the end rail 54. Outwardly of the end rail 54 the adjusting rod 72 carries a second spherical washer assembly 88 which bears against the outer face of the end rail 54 and is engaged by an outer adjusting nut 90. It will be seen that the adjusting rod 72 controls the relative position of the mounting plate 62 relative to the base 58.

The mounting plate 62 carries a positioning boss 92 which is tightly received within a bore 94 of a part of a mounting bracket 96 of the label magazine 18. The mounting bracket 96 is fixedly secured to the mounting plate 62 by means of fasteners 98.

Referring now particularly to FIG. 1, it will be seen that the label stack has an axial center AC. The axial center AC is a line extending through the center of each label, with the line being parallel to the general plane of the base 58. The axial center AC is the center of curvature for the rails 64 and the grooves 48. Thus by adjusting the mounting plate 62 relative to the base 58, the labels L of the label stack are rotated or slewed about their centers. With respect to the schematic illustration of FIG. 3, it will be seen that the slewing of a label about its center results in a like slewing of the label, in its transferred position, relative to the axis of the mold half cavity C. Thus the slew or rotational position of a label with respect to a mold half cavity may be readily controlled using the slew control device 20.

In order to maintain the tightness of the fit between the rails 64 and the grooves 48, each side rail 42, 44 may be provided with a set screw 100 which opens into its respective groove 48. Each set screw 100 is provided with a lock nut 102.

At this time it is pointed out that only a single example of usage of the slew control device 20 has been illustrated and described. In FIG. 1, the slew control device 20 is illustrated as being of the side mount type. Actually, this mount is primarily used in association with a dual cavity mold wherein there would be two hoppers and two sets of labels. In such a construction the second hopper would be carried by a second slew control device and placed above the illustrated hopper and slew control device. In this instance, the slew control device may be rotated 180° so that the adjusting mechanism would be uppermost.

It is also to be understood that the illustrated hopper or magazine may be supported by a slew control device 20 which overlies the hopper or magazine so as to provide for a direct mount instead of a side mount.

Although only a single and preferred embodiment of the slew control device and its usage have been illustrated and described herein, it is to be understood that minor variations may be made in the slew control device and the use thereof without departing from the spirit and scope of the invention as defined by the appended claims.

We claim:

1. A mounting device comprising a label magazine for supporting a label having a center, and a slewable mounting unit carrying said label magazine and forming means for adjustably slewing said label magazine about center.

2. A mounting device according to claim 1 wherein said mounting unit includes a base, a mounting plate, and an arcuate track arrangement between said base and said mounting plate, said arcuate track arrangement having a center of curvature along a line passing through said center of said label and parallel to the general plane of said base.

3. A mounting device according to claim 2 together with an adjustment member extending between said base and said plate for maintaining said plate in an adjusted position relative to said base.

4. A mounting device according to claim 2 wherein said base includes a pair of spaced side bars having opposed selected ones of cooperating rails and guideways, and said plate having at opposite sides thereof the others of said cooperating rails and guideways.

5. A mounting device according to claim 2 wherein said base includes a pair of spaced side bars having opposed selected ones of cooperating rails and guideways, and said plates having at opposite sides thereof the others of said cooperating rails and guideways, and end rails joining together said side rails.

6. A mounting device according to claim 3 wherein said base includes a pair of spaced side bars having opposed selected ones of cooperating rails and guideways, and said plates having at opposite sides thereof the others of said cooperating rails and guideways, and end rails joining together said side rails.

7. A mounting device according to claim 6 wherein said adjustment member is an elongated rod having a pivotal connection with said mounting plate and being adjustably slidable through one of said end rails.

8. A mounting device according to claim 4 wherein said rails are carried by said mounting plates, said grooves are formed in said side rails, and said side rails carry adjustable slack takeup members extending into said grooves.

9. A mounting device according to claim 2 wherein said base is carried by a multi-direction adjustable support.

10. A mounting device according to claim 1 wherein said magazine is associated with a blow molding machine having radially opening molds mounted for rotation, and transfer means for transferring a label into a mold half.

11. A mounting device according to claim 10 wherein each mold half has a longitudinal axis, and each label being slewable relative to said longitudinal axis in that general plane of said mold which exists at the time of label deposit.

* * * * *